Figure 1:
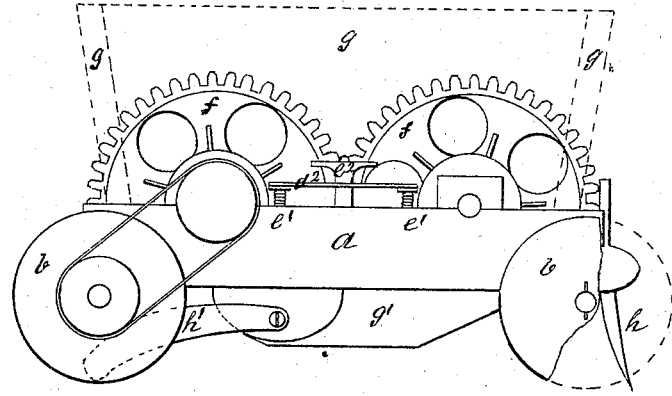

A. D. GRISWOLD.
Cotton-Seed Planters.

No. 138,497. Patented May 6, 1873.

UNITED STATES PATENT OFFICE.

ALBERT D. GRISWOLD, OF ROCKY HILL, CONNECTICUT.

IMPROVEMENT IN COTTON-SEED PLANTERS.

Specification forming part of Letters Patent No. 138,497, dated May 6, 1873; application filed March 22, 1873.

*To all whom it may concern:*

Be it known that I, ALBERT D. GRISWOLD, of Rocky Hill, county of Hartford and State of Connecticut, have invented certain new and useful Improvement in Cotton-Seed Planters; and to enable others skilled in the art to make and use the same I will proceed to describe, referring to the drawing, in which the same letters indicate like parts in each of the figures.

The nature of this improvement will be understood from the specification and drawing.

Figure 2:
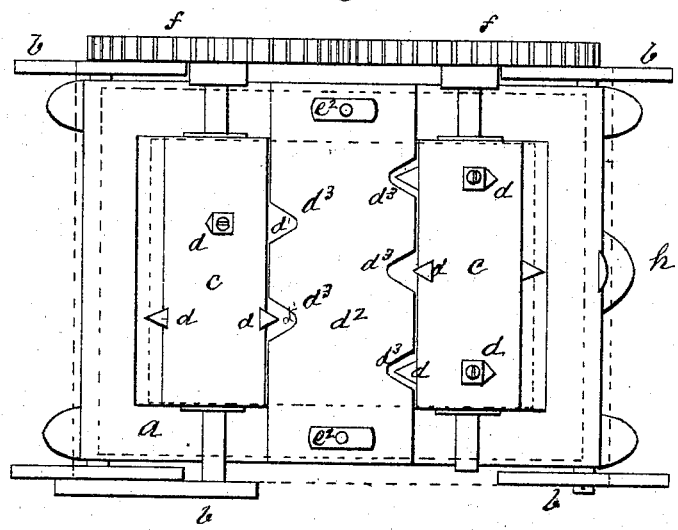

In the accompanying drawing, Figure 1 is a side elevation, partly in section. Fig. 2 is a top view, showing the upper and lower edge of the hopper by dotted lines.

$a$ is the frame-work of the machine. $b$ are the ground-wheels by which the machine is operated and rides over the ground. $c$ are feed-rollers, the journals of which are fitted into boxes in the frame-work. $d$ are V-shaped feeders, arranged and secured irregularly at intervals upon the surface of the rollers $c$, so that as they revolve they will conduct seed from the hopper $g$ through the V-shaped openings $d^1$ formed in the adjustable spring or yielding-plate $d^2$, which is arranged between the rollers and upon the frame-work by screw-spindles, and is supported by spiral springs $e^1$, and held and adjusted by thumb-nuts $e^2$. $g$ is the hopper, as shown by dotted lines, secured to the machine in a detachable manner, into which the seed is placed for distribution. $f$ are gears secured to the outer ends of the journals of the rollers $c$, for the purpose of producing uniform action of each roll toward the plate $d^2$. This plate is provided with openings $d^3$, through which the seed is fed by the feeders $d$ into the discharge-hopper $g^1$, thence into the ground-furrow formed by the cultivator-tooth $h$, secured in front and nearly in the center of the frame-work. This furrow is covered, after the seed is dropped therein, by diverging scraper-plates $h^1$, which are secured to the rear portion of the machine and operate in the common way. The feed-rollers are actuated from the ground-rollers by chain, band, or other known ways.

Now it will be seen that, after placing the seed into the hopper $g$ and drawing the machine forward in the common way, the feeders will separate and alternately discharge the seed through the openings into the discharge-hopper, thence into the ground furrow; and if there should be any slight resistance by clogging, the plate $d^2$ will yield and allow the seed to separate one from the other, and freely and regularly discharge the seed to the ground.

I believe I have shown the nature and construction of this improvement so as to enable others skilled in the art to make and use the same therefrom.

I claim—

The combination of the feed-rollers $c$ having feeders $d$, adjustable yielding feed-plate $d^2$, gears $f$ with the cultivator $h$, covering-plates $h^1$, and hoppers $g$ $g^1$, arranged and operating substantially as and for the purpose set forth.

ALBERT D. GRISWOLD. [L. S.]

Witnesses:
JUSTUS A. TRAUT,
JEREMY W. BLISS.